(12) United States Patent
Amzallag et al.

(10) Patent No.: US 8,543,919 B1
(45) Date of Patent: Sep. 24, 2013

(54) IN-PAGE FULL SCREEN INTERNET VIDEO METHOD

(75) Inventors: Tristan D. Amzallag, Purchase, NY (US); Maria C. Klink, West New York, NJ (US); Christopher B. Young, Purchase, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/453,670

(22) Filed: Apr. 23, 2012

Related U.S. Application Data

(63) Continuation of application No. 12/841,536, filed on Jul. 22, 2010, now Pat. No. 8,166,399, which is a continuation of application No. 11/072,214, filed on Mar. 4, 2005, now Pat. No. 7,788,583.

(60) Provisional application No. 60/550,097, filed on Mar. 4, 2004.

(51) Int. Cl.
*G06F 3/00* (2006.01)

(52) U.S. Cl.
USPC .................. 715/719; 715/781; 715/760

(58) Field of Classification Search
USPC .............. 715/716–719, 733, 760, 764, 765, 715/771, 781, 970, 203, 205; 345/581, 589, 345/592, 629
See application file for complete search history.

(56) References Cited

U.S. PATENT DOCUMENTS

| | | |
|---|---|---|
| 5,343,557 A | 8/1994 | Kiel et al. |
| 5,610,653 A | 3/1997 | Abecassis |
| 6,006,161 A | 12/1999 | Katou |
| 6,606,102 B1 | 8/2003 | Odom |
| 6,981,227 B1 | 12/2005 | Taylor |
| 7,053,951 B2 | 5/2006 | Miller et al. |
| 7,155,674 B2 | 12/2006 | Breen et al. |
| 7,161,632 B2 | 1/2007 | Sudo |
| 7,174,512 B2 | 2/2007 | Martin et al. |
| 7,219,308 B2 | 5/2007 | Novak et al. |
| 7,248,303 B2 | 7/2007 | Iwaki |
| 7,266,394 B2 | 9/2007 | Carlson et al. |
| RE41,104 E | 2/2010 | Iwaki |
| 7,788,398 B2 | 8/2010 | Chapweske et al. |
| 7,788,583 B1 | 8/2010 | Amzallag et al. |
| 7,792,925 B1 * | 9/2010 | Werner et al. ............. 709/219 |
| 7,965,315 B2 | 6/2011 | Jang |
| 7,966,565 B2 | 6/2011 | Dawson et al. |
| 2002/0030652 A1 | 3/2002 | Shibata et al. |
| 2003/0146927 A1 | 8/2003 | Crow et al. |
| 2003/0174160 A1 | 9/2003 | Deutscher et al. |
| 2003/0189571 A1 | 10/2003 | MacInnis et al. |
| 2003/0237043 A1 * | 12/2003 | Novak et al. ............. 715/500.1 |
| 2004/0125126 A1 | 7/2004 | Egawa et al. |
| 2009/0158155 A1 | 6/2009 | Quinn et al. |
| 2011/0122063 A1 * | 5/2011 | Perlman et al. ............. 345/161 |
| 2012/0033942 A1 * | 2/2012 | Tsumagari et al. ......... 386/241 |

* cited by examiner

*Primary Examiner* — Xiomar L Bautista
(74) *Attorney, Agent, or Firm* — Fish & Richardson P.C.

(57) ABSTRACT

A method is provided for playing a video clip on a computer monitor in a full screen mode. Activation of a link to the video clip on a web page results in the video clip being played automatically in full screen mode on the computer monitor. Upon the video clip ending, the full screen mode ends and returns the display to the previous view of the web page. The full screen mode plays the video clip with integrated with a transparent video control panel that has controls to enable user control of the playing of the video clip.

18 Claims, 5 Drawing Sheets

IN-PAGE FULL SCREEN INTERNET VIDEO METHOD

CLAIM OF PRIORITY

The present application is a continuation of and claims priority under 35 U.S.C. 120 to U.S. application Ser. No. 12/841,536, filed Jul. 22, 2010 now U.S. Pat. No. 8,166,399, which is a continuation of and claims priority under 35 U.S.C. §120 to U.S. application Ser. No. 11/072,214, filed Mar. 4, 2005 now U.S. Pat. No. 7,788,583, which claims priority under 35 U.S.C. §119(e) to U.S. Provisional Patent Application Ser. No. 60/550,097, filed Mar. 4, 2004.

BACKGROUND OF THE INVENTION

1. Field of the Invention

The present invention relates generally to a method for playing a video segment on a computer monitor.

2. Description of the Related Art

Computers make it possible to play multimedia materials for viewing by the 20 computer user. Various multimedia players are known for use on computers. These media players are either separate software components or are integrated together with other software. Typically, a media file is received by a computer and may be stored on local storage in the computer or stored temporarily in memory for the duration of playing. The user of the computer activates a media player program or program component, which opens in a window of a windows-based operating system on the graphical user interface. The window typically includes the attributes of other windows of the operating system, including file menus, title bars, borders and the like. It may be necessary for the user to initiate play of the multimedia file, or the file may automatically play in the media player. When the file has completed playing in the media player, the user must close the media player to return to the previous view of the graphical user interface.

SUMMARY OF THE INVENTION

The present invention provides a method for playing multimedia files, in particular video clips, on a computer monitor so that the media file is played in a full screen format automatically upon activation of a link to the file and so that the full screen format closes automatically after playing the media file. The full screen format plays the video clip, for example, without borders, file menus and the like. The user may control play of the video clip by controls integrated with the full screen view.

DETAILED DESCRIPTION OF THE PREFERRED EMBODIMENTS

Figure 1:
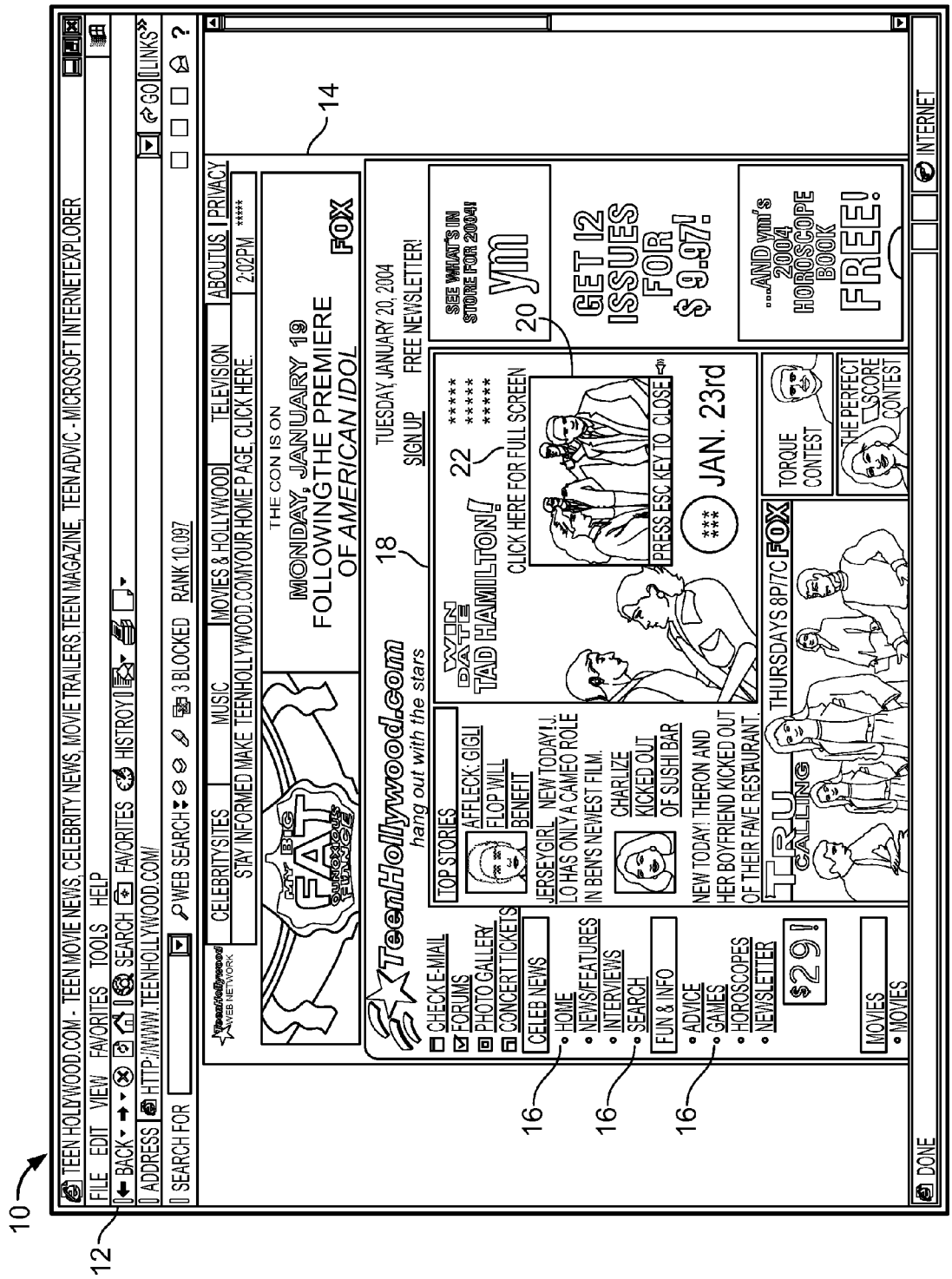
FIG. 1 is a screen shot of a computer monitor screen with a web page displayed that has a link to the present full screen video.

Referring first to FIG. 1, a computer monitor screen 10 shows that a web browser program 12 is running on the computer to access pages on the World Wide Web (WWW). The browser program 12 has a border, title bar, address line, file menu and other on screen features that are common to current computer programs operating on a graphical user interface (GUI) computer under Microsoft Windows operating system, for example. The displayed web page 14 is accessed by the browser 12 and is commonly written in Hyper Text Markup Language (HTML) and are available over networks, including Local Area Networks (LAN), Wide Area Networks (WAN) and the Internet. A characteristic of HTML pages is the presence of links 16 that upon activation direct the computer browser 12 to another page, another site, or another computer file.

In the illustrated web page 14 shown on the monitor screen 10, a number of graphical elements are presented for viewing by the user. The graphical elements include an advertising element 18 for a cinematic film. In this example, it is the film, "Win a Date With Tad Hamilton." The advertising element 18 include information about the cinematic film, including the title, actors staring in the film, opening date in theaters, and the like. The advertising element 18 also includes a still scene 20 from the film. Adjacent the still scene, in this example above the still scene, is an instruction 22 to the user to "Click Here for Full Screen".

Figure 2:
FIG. 2 is a screen show of a full screen video playing mode according to the principles of the present invention.

When the user moves a pointer, for example a mouse pointer; trackball pointer, touchpad point or other pointing device, over the still scene portion 20 of the display screen 10 and "clicks" the pointing device, a link to a file containing a video clip is accessed. The video clip includes programming to cause the clip to be played in full screen mode. An example of the full screen mode 24 is shown in FIG. 2, wherein the entire display portion of the computer monitor is utilized to show the video clip. In the illustrated example, the video clip extends from one side of the display to the other side without borders or other limitations on the user's view of the video. In particular, no file menus, borders, title bars, address bars or other screen components are on the screen in the full screen mode. The example in FIG. 2 is presented in so-called letter box format with black bands 26 across the top and bottom portions of the display screen. This enables a more square display screen to display a widescreen video format more common in cinematic films. According to the present invention, such widescreen displays are full screen displays.

The full screen display 24 opens automatically upon activation of the link by clicking. The video clip at the link begins playing automatically when the full screen mode opens. The video clip plays through to the end on the computer monitor, providing the user with a sample of the cinematic film advertised in the advertising screen element. The user can stop the playing of the video clip. In the present example, this is accomplished in this embodiment by the user pressing the escape key (ESC) on the computer keyboard as instructed in the instruction 28. Once the escape key is pressed, the full screen display 24 closes and the display returns to the previous screen, which here is the screen shown in FIG. 1.

Figure 3:
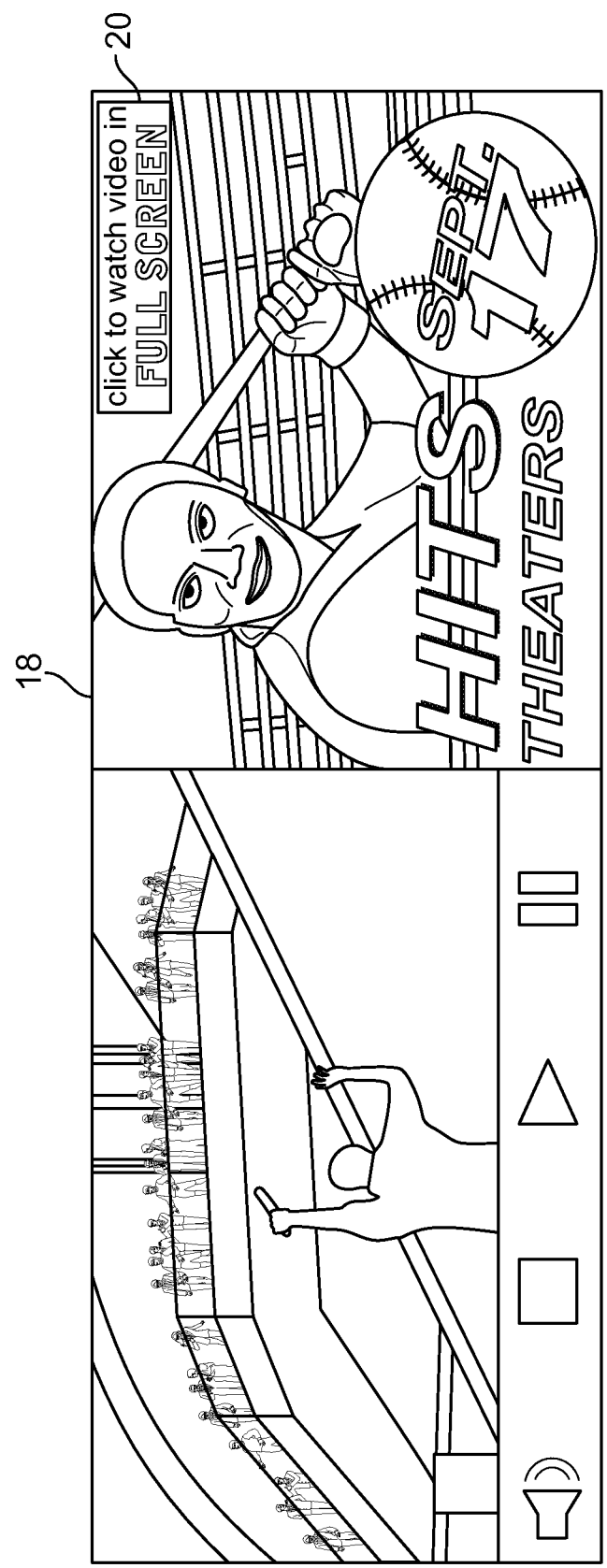
FIG. 3 is screen shot of a window portion of a web page display with a link to present a full screen video.

In another embodiment as shown in FIG. 3, the advertising link is provided as an element 18 of a display screen. Only the element is shown in the Figure. On the right side of the element is the link 20 to the full screen video clip. The link 20 indicates to the user to "click to watch video in full screen". Upon activation of the link 20 such as by clicking with a mouse or other pointer, the monitor of the computer switches to full screen mode and plays the video.

Figure 4:
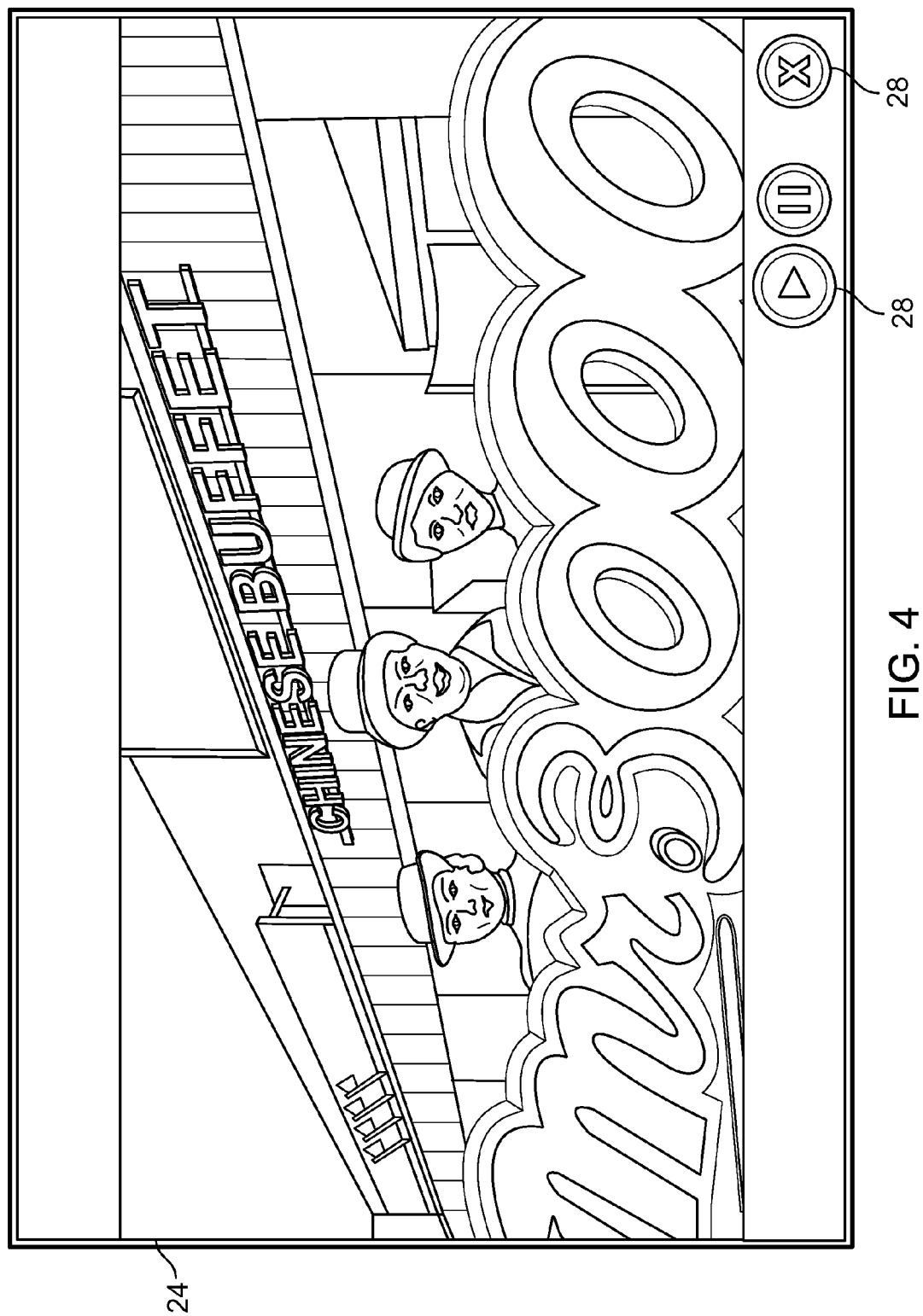
FIG. 4 is a screen shot of a full screen video playing mode of a second embodiment.

The video playing in full screen mode 24 is shown in FIG. 4, where it occupies the full extent of the computer monitor's screen, at least in one direction. In the illustrated view of FIG. 4, the full screen mode 24 displays the video clip in the wide screen format of cinematic films and so provides the letter box format with black bars 26 at the top and bottom of the screen. The video clip occupies the middle portion of the display.

The full screen display of this embodiment includes on screen controls 28 for controlling the playing of the video. The on screen controls 28 here include a stop button, shown as an "X", a pause button shown here as a "||" and a play button shown here as a "▶". The control buttons 28 may also be in the form of words that describe the function, such as "play", "stop", "pause", and the like or can be symbols or other indicators. The term button here extends to any indication of a portion of the display that can be activated to carry out the respective function.

The on screen controls 28 are graphical elements that indicate corresponding areas of the screen that accept a mouse or other pointer click to perform the indicated function. Here, the stop button halts the running of the video and returns the display to the view of FIG. 3. The pause button halts the running of the video clip and leaves the frame of video that was last displayed when the pause button was pushed on the screen. Once paused, the play button is pressed to get the video play to continue from the frame where it left off. Other on-screen commands 28 are of course possible and are within the scope of the present invention.

The examples shown have included wide screen video clips shown on standard computer monitors which required letter box formatting to fit the display to the screen. The present invention is of a scope to cover all currently available display formats for playing video clips on monitors. The examples have described access to the video clips using standard computer monitors. The present invention is of a scope to cover display of the video clip on monitors, screens, panels and other displays of any currently available type, including CRT screen, flat panel displays, LCD displays, and the like. The monitors may be connected to or provided on a desktop computer, laptop computer, workstation computer, personal data assistant (PDA), mobile telephone screen, television receiver, wide screen television, or any other type of device having a display screen or display monitor.

Figure 5:
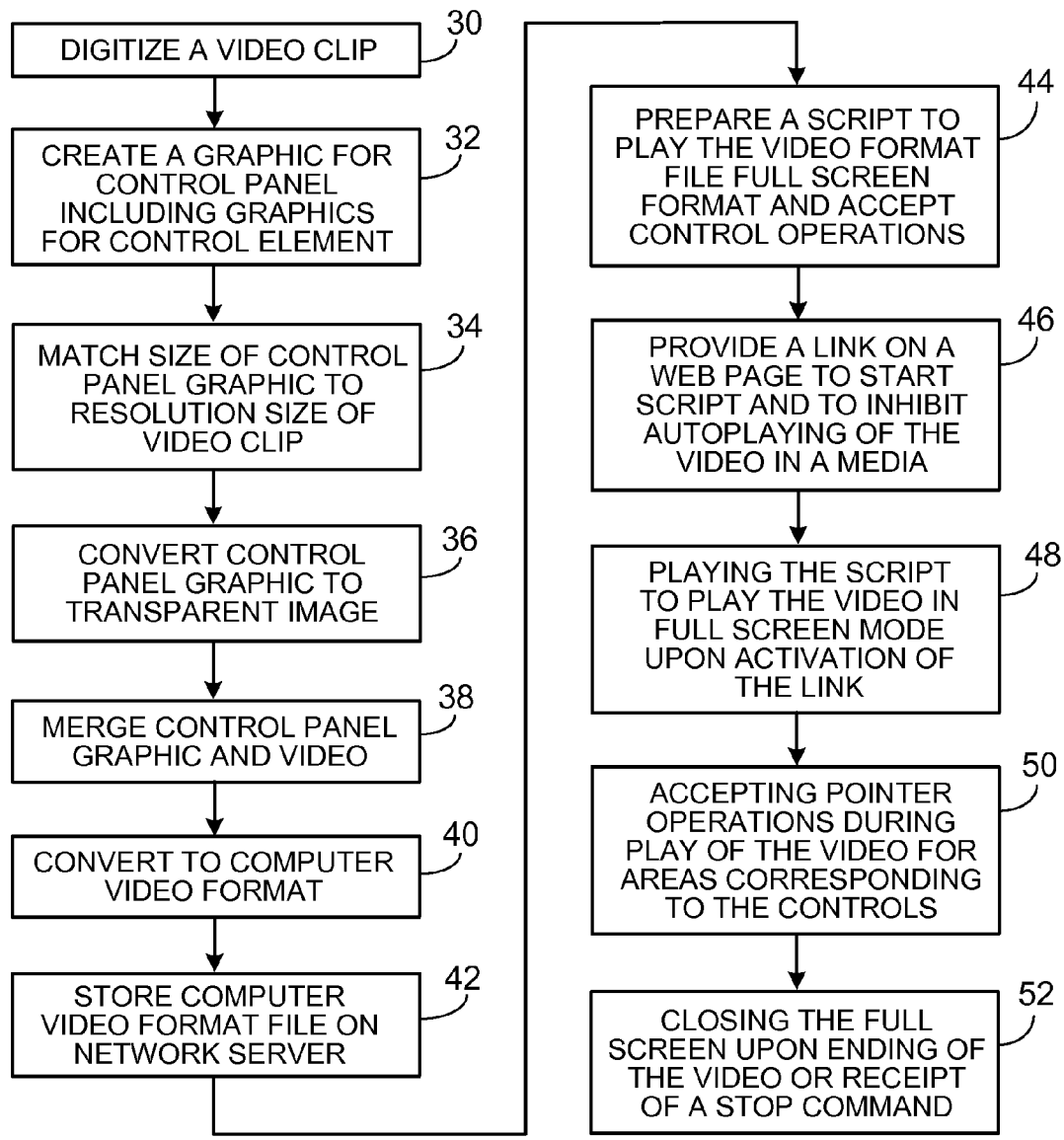
FIG. 5 is a process flow chart for preparation and playing of a full screen video.

The process, or method, of the present invention is shown in greater detail in FIG. 5, wherein in step 30 a video clip to be displayed in full screen mode is digitized. In other words, the video clip, if it is not already in a digital format, is converted to a digital format. In the preferred embodiment, the video clip is digitized into an avi format, (AVI=audio video interleaved). This is the basic video encode from which all compression begins. Other digital video formats are of course within the scope of this invention.

The video clip may be of any length but in one example is of 90 seconds duration. The clip should be of a convenient duration to provide a sample of the cinematic film, television show or other item being promoted but not so long as to cause most users to stop the running of the video before it ends.

In step 32, a graphic is created for the control panel including graphical elements for the control buttons. The graphic can be created anew for each different video clip or a common graphic can be used for many different video clips, as desired. To create the control panel, programs such as Adobe Premiere or Adobe Photoshop may be used. It is possible to use other graphics programs as well.

The control panel graphic may include the following controls for the end user to click on: a play button, a stop button, a mute button, a replay button, a pause button, and any other functionality requested by for accessing the video clip or accessing other elements, such as the web browser. The controls may be provided at any location in the control panel. It is foreseen to provide the buttons at locations that will not interfere with viewing the significant portions of the video clip. For example, in many video clips the lower portion of the screen does not show any significant action or items of interest so this lower portion can be the location of the control buttons. Once the control buttons are in their desired location in the control panel graphic, the left and right and top and bottom coordinates of each button are recoded as a percentage of the over all image size. The Adobe Photoshop program displays the percentage positioning of the buttons when a mouse pointer is positioned over the area of the buttons and this information is recorded. The position information may be recorded manually or automatically. The extent of each button is also preferably recorded.

Next, in step 34, the image size of the control panel image is matched to the image size of the video clip. For example, the image size of the control panel graphic may be 320 pixels by 240 pixels or 480 pixels by 320 pixels to match the size of the video.

In step 36, the control panel graphic is converted to a transparent image. In particular, the control panel image is provided as a transparent background and the buttons are provided in place over the transparent background as non transparent or partially transparent objects. In one example, the image is saved as a gif format file (GIF=graphic information file) while still preserving the transparent background.

In step 38, the control panel graphic and the video file are merged together. The transparent background of the control panel image permits the video to be seen through the panel image. The program Adobe Premiere, a video editing software package, is used to merge the video and the control panel image together into a compressible format. Specifically, the video file and the control panel image file are both loaded into the program. The video is dragged (a mouse or other pointer function enabling file movement, for example) to a time line and the image is dragged to the timeline above the video, thereby layering the control panel image over the video. This creates a new video file from the merged files.

In step 40, the merged control panel image and video clip are converted to a computer video format. For example, the new file is exported in avi format. Adobe Premiere is used for this step in one example.

Thereafter, the merged file is stored as a video format file on a computer system or network server or the like and accessible over a network or on the Internet, as shown at step 42. The stored file should be in a form that reduces storage capacity, and is preferably compressed. For example, windows media encoder (WME) is used to compress the video for Internet delivery. The settings and directions are used to provide best image quality. The encoded file is placed onto either an http or a windows streaming server to be delivered over the Internet.

A program or script is prepared at step 44 to play the computer video format file in full screen mode and to enable the controls on the control panel. In one example, the script is a JavaScript program. The script indicates to the video player to display the video fully instead of displaying it within the space allotted for the advertising element. The JavaScript code resides in the same file as the object code for the video. The full screen display requires that the code be written on a separate webpage in order for the control panel to work. This is done using an iframe, also known as an inline frame, to load in the new page in a hidden space above the advertising element. The iframe is placed into a layer with settings that enables the iframe to remain hidden from the user and not disrupt the full screen display of the video clip.

The html page with the iframe contains the functions to launch the video into a full screen mode and keep in that state until the user hits the close button or until the video ends. The function detects the position of the mouse pointer while it is over the video in full screen mode. The position of the mouse pointer is detected from its top and left position, which is its position relative to the top/left point of the screen, which is assigned coordinates 0,0. This information corresponds to the position information for the control buttons while creating the control panel graphic.

An example of the html/JavaScript that gets written to the iframe follows:

```
<!DOCTYPE HTML PUBLIC "-//W3C//DTD HTML 4.01 Transitional//EN">
<html>
<head>
<meta http-equiv="Content-Type" content="text/html; charset=iso-8859-1">
</head>
<body marginwidth=0 marginheight=0 topmargin=0 leftmargin=0>
</body>
</html>
```

The entire code for the iframe is required for the full screen mode to work properly. An example of the code for the iframe itself follows:

```
<div id="fs_vid" align="left" style='position:absolute; left:0px; top:0px; visibility: hidden'>
<iframeID='FSID_wmv'        src='dis014_wmv.htm' width='1' height='1' frameborder=0 scrolling='no'></iframe>
</div>
```

At step 46, a web page is provided on the network or on the Internet which has a link to the script and the video file. The link preferably indicates to the user that the link should be activated, or "clicked" to access a full screen video. In other words, an online advertisement is provided which resides in a page which plays video within the advertising unit.

In step 48, the user has used a browser program to access the web page with the link and has clicked or otherwise activated the link on the web page which results in the script being played and the video playing in full screen format on the user's computer monitor. The JavaScript file is called from the advertising unit. The call goes from the advertising unit, which resides on the parent layer, to the JavaScript in the iframe that was created. The JavaScript then interfaces with the Windows Media Player and tells it to start the video. The video clip opens up and plays over the users entire computer screen utilizing the Windows Media Player. The video loads in a webpage inside an ad tag while it is playing.

The object code of the Windows Media Player is provided on the web page so as to tell the web browser when the browser accesses the web page that it will have windows media video playing on the page, however this video is not auto play. The result is that the object is written and the video is queued up but it will not play so as not to disrupt the video playing the in the original ad. The video only begins to play once the full screen link button is pressed by the user to cause the play function to be executed.

To prevent the autoplay function from playing the video clip on the web page, the following script is included to setup the player in the iframe:

```
<OBJECT       ID=km_player       name=km_player CLASSID=CLSID:6BF52A52-394A-11D3-B153-00C04F79FAA6
codebase="http://activex.microsoft.com/activex/controls/mplayer/en/nsmp2inf.cab#Version=5,1,52,701"
standby='Loading Microsoft Windows Media Player components . . . '
TYPE='application/x-oleobject' width='0' height='0'>
  <PARAM NAME='url' VALUE='dis014.wmv'>
  <PARAM NAME='AutoStart' VALUE='false'>
  <PARAM NAME='uiMode' VALUE='none'>
  <PARAM NAME='fullScreen' VALUE='false'>
  <Embed   SRC="dis014.wmv"   type="application/x-mplayer2"   pluginspage="http://www.microsoft.com/Windows/Downloads/Contents/Products/MediaPlayer/"Name=km_player ID="km_player" width='0' height='0'></embed>
</OBJECT>
```

As can be seen, there is a line that will not let the video autoplay: <PARAM NAME='AutoStart' VALUE='false'>.

Once the full screen button is clicked in the advertising unit, it is treated as a play command and will start playing the video automatically. If there is no video playing then it will not open to full screen mode.

At step 50, the coordinates of the mouse position are detected upon the user clicking the mouse pointer. If the mouse pointer is clicked in an area where there is a button in the control panel (as determined by percentage coordinates of the images) then the appropriately designated code is executed. For example, if the mouse is clicked on position 90% from the top and 95% from the left and that position is designated within the area of the pause button, then the code to pause the video is executed and the video will pause mid stream.

JavaScript is used to detect the position of the mouse pointer once the user clicks the button. This is done with the following code:

```
<SCRIPT   LANGUAGE="JScript"   for="km_player" event="MouseDown(nButton, nShiftState, fX, fY)">
```

At step 52, the full screen mode is closed upon the ending of the video clip or upon the user clicking on a stop command in the control panel.

Additional features are also provided as options according to the present invention.

As a further feature of the invention, a tracking program monitors the user's activation of the full screen display and tracks the amount of the video that has been played by the user. For instance, the tracking may track the number of seconds or in milliseconds of video that users watch. The tracking information is sent via http to a tracking server. This information can provide feedback for providers of the present method.

In an added feature, an option is provided to automatically spawn a browser window behind the full screen video at a predetermined time interval. This window will link to a predetermined webpage.

Finally, the invention provides for the ability to display an image at the beginning of the video while the Windows Media Player platform is loading and while the video streams down to the user's machine. In one example, this image is a still image, while in another embodiment, it is a brief video. There is also be the ability to display an image, such as a still image or short video, when the main video has finished its playback.

The present invention finds particular use in advertising of products and services to the user. It is particularly well suited for providing selected scenes of cinematic movies so as to entice the user to see the entire movie. It is also foreseeable to use the present full screen video to provide sample scenes from television shows, stage shows, and other entertainment. In addition to using the present method for showing brief portions of the movie or show, it is also possible to show an entire show, film, animation, television commercial, or other video file. For example, an Internet site may offer links to short films, which are shown in their entirety using the present method. Longer works are also possible. It is also possible that video clips promoting video games may be shown using the present invention, or even that some video games may be played using the present full screen display.

Thus, there has been shown and described a method for enabling a video clip to be shown in full screen mode on a computer monitor. The user is provided with the option to "Click for full screen". Upon so doing, the video plays in full screen mode. While viewing the video in full screen mode, the end user can click controls in the control panel to close the video and go back to the webpage. There is an image or text inside the advertisement acts like a button and when clicked will call a JavaScript program that will display the video fully on the screen as opposed to inside the ad. The video keeps playing from where it was when the button was clicked. Additionally, when the video is in full screen mode there is displayed an image or a button that will bring the display back to its regular size when clicked on.

The result is an in-page video advertisement on the Internet, which allows the end user, at their discretion to select a full screen playback of the video clip. Once in the full screen mode, this present method enables the user to seamlessly close out of the full screen mode. The provider of the video can also measure the amount of time the user watched the video and are able to control the beginning and ending images displayed before and after the video plays.

Although other modifications and changes may be suggested by those skilled in the art, it is the intention of the inventors to embody within the patent warranted hereon all changes and modifications as reasonably and properly come within the scope of their contribution to the art.

The invention claimed is:

1. A method comprising:
   accessing a video clip;
   generating control indicators for playback of the video clip;
   merging, by a computer, the video clip and the control indicators together into a merged video for display in a first webpage; and
   generating a script for inclusion in contents of a second webpage that differs from the first webpage;
   wherein the script is configured to launch the merged video in a full screen display mode;
   wherein the control indicators are shown during the playback of the merged video in the full screen display mode;
   wherein data for the first webpage comprises instructions to load contents of the second webpage into a portion of the first webpage, with the contents of the second webpage loaded being hidden from display in the first webpage.

2. The method of claim 1, wherein the control indicators comprise indicators to perform at least one of a play operation, a stop operation, a mute operation, a replay operation and a pause operation.

3. The method of claim 1, wherein the first webpage comprises a link to the merged video.

4. The method of claim 3, wherein selection of the link activates the script, causing the playback of the merged video in the full screen display mode.

5. The method of claim 1, further comprising:
   storing the merged video on a network server with a web browser compatible script code for playback in the full screen display mode.

6. The method of claim 1, further comprising:
   displaying an image, during loading of the merged video in the full screen display mode.

7. A system comprising:
   one or more computers; and
   one or more computer-readable storage media storing instructions that are executable by the one or more computers to perform operations comprising:
   accessing a video clip;
   generating control indicators for playback of the video clip;
   merging, by a computer, the video clip and the control indicators together into a merged video for display in a first webpage; and
   generating a script for inclusion in contents of a second webpage that differs from the first webpage;
   wherein the script is configured to launch the merged video in a full screen display mode;
   wherein the control indicators are shown during the playback of the merged video in the full screen display mode;
   wherein data for the first webpage comprises instructions to load contents of the second webpage into a portion of the first webpage, with the contents of the second webpage loaded being hidden from display in the first webpage.

8. The system of claim 7, wherein the control indicators comprise indicators to perform at least one of a play operation, a stop operation, a mute operation, a replay operation and a pause operation.

9. The system of claim 7, wherein the first webpage comprises a link to the merged video.

10. The system of claim 9, wherein selection of the link activates the script, causing the playback of the merged video in the full screen display mode.

11. The system of claim 7, wherein the operations further comprise:
    storing the merged video on a network server with a web browser compatible script code for playback in the full screen display mode.

12. The system of claim 7, wherein the operations further comprise:
    displaying an image, during loading of the merged video in the full screen display mode.

13. One or more computer-readable media configured to store instructions that are executable by one or more computers to perform operations comprising:
    accessing a video clip;
    generating control indicators for playback of the video clip;
    merging, by a computer, the video clip and the control indicators together into a merged video for display in a first webpage; and
    generating a script for inclusion in contents of a second webpage that differs from the first webpage;
    wherein the script is configured to launch the merged video in a full screen display mode;
    wherein the control indicators are shown during the playback of the merged video in the full screen display mode;
    wherein data for the first webpage comprises instructions to load contents of the second webpage into a portion of the first webpage, with the contents of the second webpage loaded being hidden from display in the first webpage.

14. The one or more computer-readable media of claim 13, wherein the control indicators comprise indicators to perform at least one of a play operation, a stop operation, a mute operation, a replay operation and a pause operation.

15. The one or more computer-readable media of claim 13, wherein the first webpage comprises a link to the merged video.

16. The one or more computer-readable media of claim 15, wherein selection of the link activates the script, causing the playback of the merged video in the full screen display mode.

17. The one or more computer-readable media of claim 13, wherein the operations further comprise:
 storing the merged video on a network server with a web browser compatible script code for playback in the full screen display mode.

18. The one or more computer-readable media of claim 13, wherein the operations further comprise:
 displaying an image, during loading of the merged video in the full screen display mode.

* * * * *